US012585488B2

(12) United States Patent
Shields et al.

(10) Patent No.: US 12,585,488 B2
(45) Date of Patent: Mar. 24, 2026

(54) DYNAMIC SCRIPT GENERATION AND EXECUTION IN CONTAINERS

(71) Applicant: Hewlett Packard Enterprise Development LP, Spring, TX (US)

(72) Inventors: Eoghan Shields, Galway (IE); Ravi Shekhar Jha, Galway (IE); Pablo Gon Sanchez, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 505 days.

(21) Appl. No.: 18/173,752

(22) Filed: Feb. 23, 2023

(65) Prior Publication Data

US 2024/0289153 A1    Aug. 29, 2024

(51) Int. Cl.
*G06F 9/46* (2006.01)
*G06F 9/455* (2018.01)
*G06F 9/50* (2006.01)

(52) U.S. Cl.
CPC ...... *G06F 9/45558* (2013.01); *G06F 9/45512* (2013.01); *G06F 9/5011* (2013.01); *G06F 2009/45591* (2013.01)

(58) Field of Classification Search
None
See application file for complete search history.

(56) References Cited

U.S. PATENT DOCUMENTS 10,089,461 B1 * 10/2018 Ha ........................... G06F 21/56
11,755,353 B2 * 9/2023 Eckl .................... G06F 9/44526
                                                                       717/115
2015/0278515 A1 * 10/2015 Foley .................... G06F 21/552
                                                                       726/23

OTHER PUBLICATIONS

Github, "Event Package", available online at <https://pkg.go.dev/github.com/docker/docker@v20.10.12+incompatible/api/types/events#Message.>, Dec. 12, 2021, 4 pages.

* cited by examiner

*Primary Examiner* — Bing Zhao

(74) *Attorney, Agent, or Firm* — Yao Legal Services, Inc.

(57) ABSTRACT

Techniques are provided for dynamically generating and executing scripts and loading documents based on container engine events in a Containers-as-a-Service (CaaS) platform. A request to generate an item, which can be either a script or a document, in an application running in a container of a cloud environment is received. Based on the request, at least one container engine event associated with the application is monitored. The at least one container engine event is detected. The item is generated based on the detection of the at least one container engine event. The generated item is instantiated in the application in accordance with a type of the generated item.

18 Claims, 6 Drawing Sheets

100

200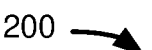

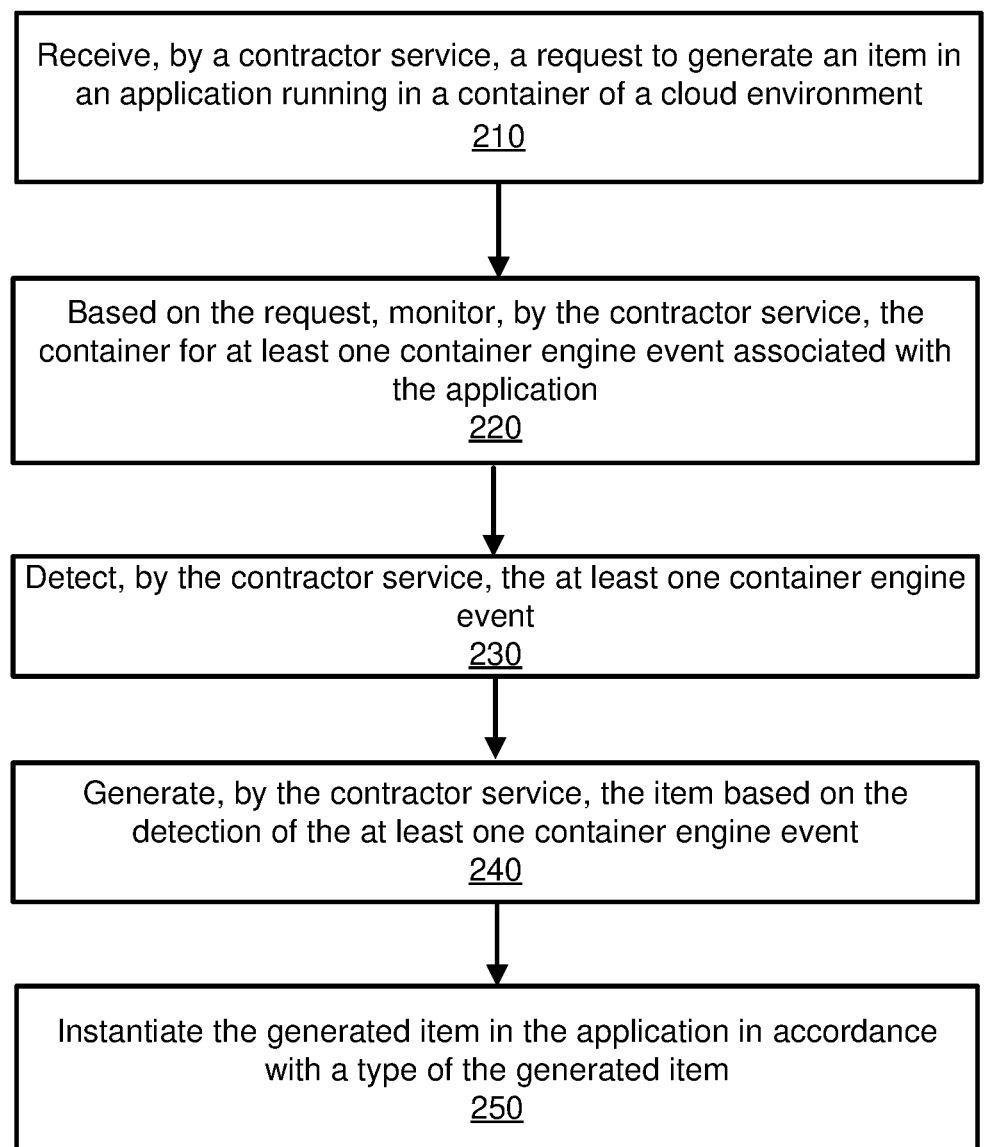

Receive, by a contractor service, a request to generate an item in an application running in a container of a cloud environment
210

Based on the request, monitor, by the contractor service, the container for at least one container engine event associated with the application
220

Detect, by the contractor service, the at least one container engine event
230

Generate, by the contractor service, the item based on the detection of the at least one container engine event
240

Instantiate the generated item in the application in accordance with a type of the generated item
250

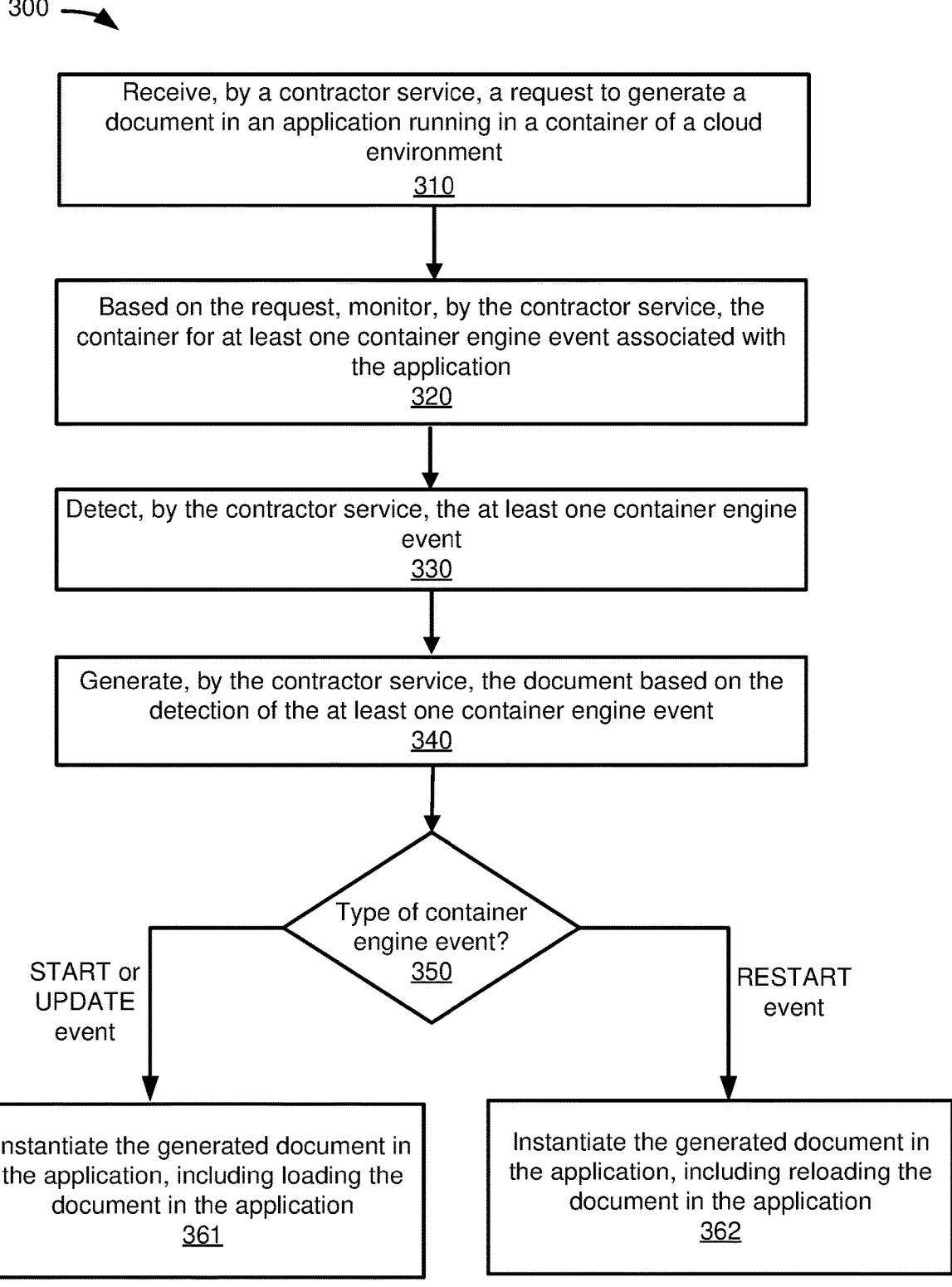

Receive, by a contractor service, a request to generate a document in an application running in a container of a cloud environment
310

Based on the request, monitor, by the contractor service, the container for at least one container engine event associated with the application
320

Detect, by the contractor service, the at least one container engine event
330

Generate, by the contractor service, the document based on the detection of the at least one container engine event
340

Type of container engine event?
350

START or UPDATE event

RESTART event

Instantiate the generated document in the application, including loading the document in the application
361

Instantiate the generated document in the application, including reloading the document in the application
362

FIG. 3

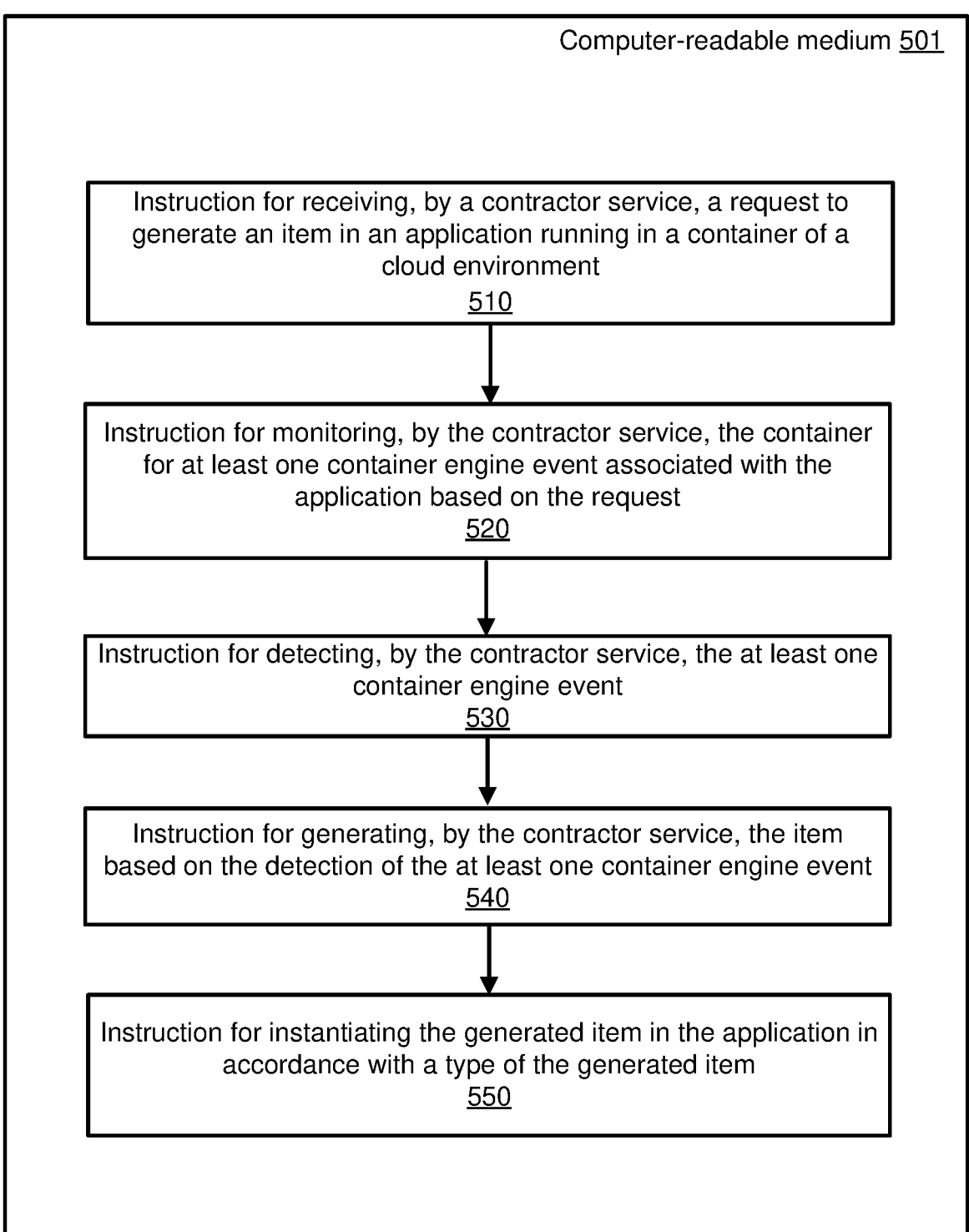

Computer-readable medium 501

Instruction for receiving, by a contractor service, a request to generate an item in an application running in a container of a cloud environment
510

Instruction for monitoring, by the contractor service, the container for at least one container engine event associated with the application based on the request
520

Instruction for detecting, by the contractor service, the at least one container engine event
530

Instruction for generating, by the contractor service, the item based on the detection of the at least one container engine event
540

Instruction for instantiating the generated item in the application in accordance with a type of the generated item
550

FIG. 5

DYNAMIC SCRIPT GENERATION AND EXECUTION IN CONTAINERS

BACKGROUND

Containers-as-a-Service (CaaS) is a platform of container-based virtualization where container engines, orchestration and the underlying computing resources are delivered to users as a service from a CaaS provider. A CaaS platform manages containers at a large scale, including starting, stopping, and organizing containerized workloads. A CaaS platform often has a plurality of applications running simultaneously in a plurality of containers launched by the applications.

BRIEF DESCRIPTION OF THE DRAWINGS

Various objects, features, aspects and advantages of the inventive subject matter will become more apparent from the following specification, along with the accompanying drawings in which like numerals represent like components.

FIG. 2 illustrates a flow diagram of a dynamic script generation and execution method in accordance with an example.

FIG. 3 illustrates a flow diagram of a dynamic document generation and loading method in accordance with an example.

FIG. 5 illustrates a computer-readable medium in accordance with an example.

Figure 1:
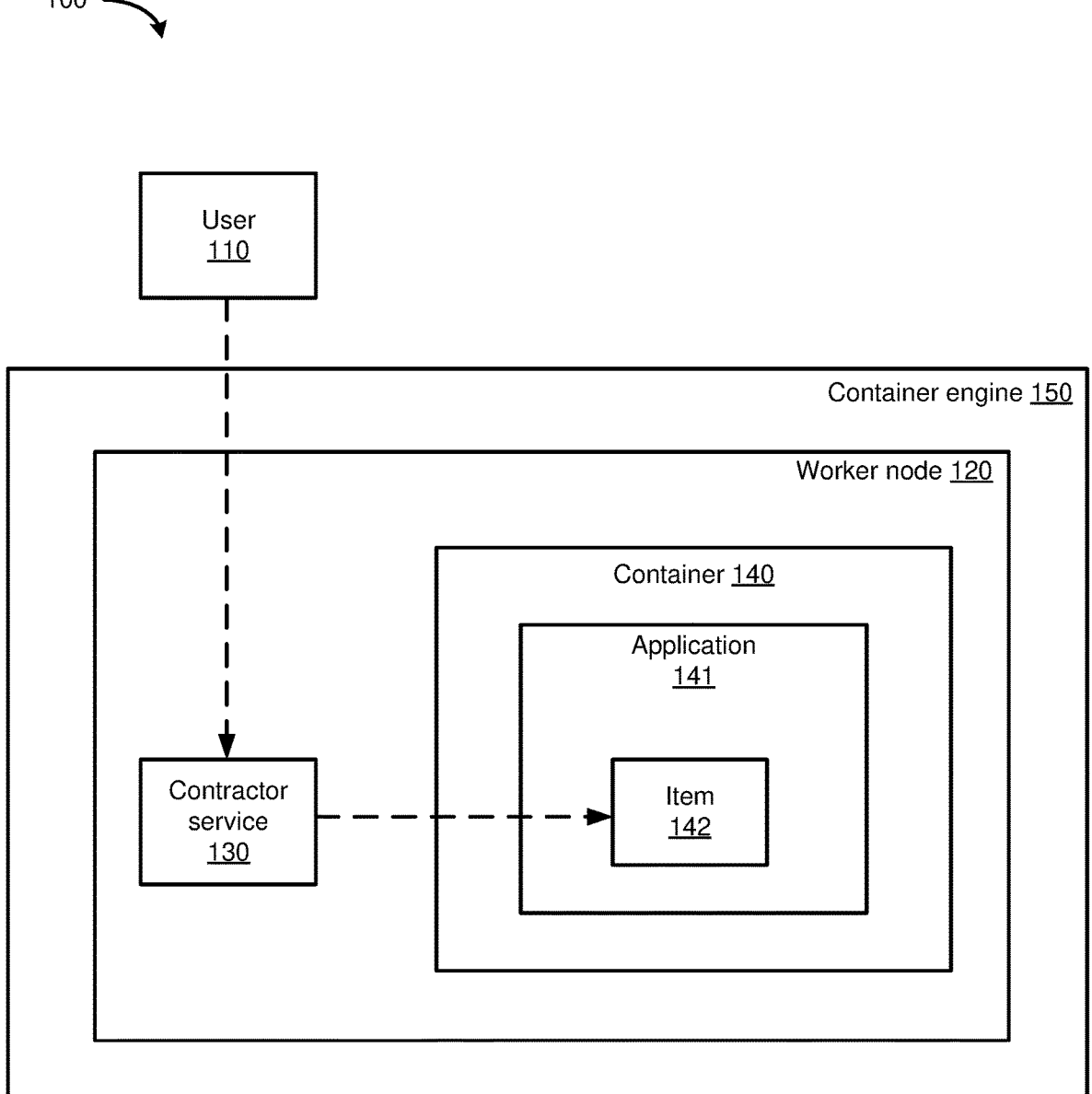
FIG. 1 illustrates an example system diagram for a dynamic script generation and execution system.

While the examples are described with reference to the above drawings, the drawings are intended to be illustrative, and other examples are consistent with the spirit, and within the scope, of the various examples herein.

DETAILED DESCRIPTION

In a CaaS platform, hundreds or thousands of containers, along with applications running in the containers, are being started, restarted, or destroyed at any given moment. In this dynamic environment, when new containers are being created or used containers are being destroyed, or when containers have status changes, some new programs or scripts may need to be executed in response to the status change. For example, when a new container is created, a monitoring program may be launched in that container.

Moreover, when containers have status changes, configurations for some existing applications may also be changed. A logging application, for example, runs in a host in a CaaS platform. It logs events of other applications and containers running in the same host and delivers log files to a destination corresponding to each application and/or container. When containers are being created, restarted or destroyed, the logging application may be reconfigured dynamically to allow the host to deliver the log files to their new destinations in the corresponding applications and/or containers. In an environment where hundreds of containers may be created, restarted or destroyed in a host in less than a second, such a task is notably challenging.

Some existing solutions, unable to handle the dynamic reconfiguration of applications in various containers in real time, employ workarounds instead. For example, some existing logging applications simply capture logs for the containers running in a host in one large log file, and use another script or program (e.g., the GNU Bison general-purpose parser generator) to parse and separate the large log file into individual log files based on the container and/or the application. The logging application then delivers the individual log files to their corresponding destinations. In these solutions, individual log files are not generated in real time because they are separated post hoc from one large log file. These solutions may also take longer processing time to complete due to the large size of the log files, often in the order of Gigabytes or even Terabytes.

Furthermore, existing solutions for logging applications are error-prone because they depend on the reliability of log files. A mistake generated by an application in a line of log file may cause the remainder of the log files to be parsed differently, hence the logs be separated incorrectly. In addition, existing solutions are typically resource intensive. They can cause significant bottlenecks in computing resources because of the huge file size and the long processing time.

The present disclosure is directed to solving the present drawbacks of executing or reconfiguring applications in a CaaS platform environment by dynamically generating and executing scripts and loading documents based on container engine events. The disclosed techniques provide ways for generating and executing scripts customized to container engine event details. The disclosed techniques also provide ways for generating or reloading documents, such as, configuration files of an application, when a container is created or destroyed. As a result, the disclosed techniques greatly improve the efficiency and capability of dynamically executing or reconfiguring applications within a CaaS environment based on container engine events.

According to an example, a request to generate an item in an application running in a container of a cloud environment is received. Based on the request, the container is monitored for at least one container engine event associated with the application. The at least one container engine event is detected. The item is generated based on the detection of the at least one container engine event. The generated item is instantiated in the application in accordance with the type of the generated item.

In some examples, where the type of the generated item is a script, instantiating the item in the application comprises executing the script in the application, and may further comprise deleting the script after executing the script in the application. In some examples, the script comprises a template corresponding to the type of the generated item and at least one parameter of the at least one container engine event.

In some examples, where the type of the generated item is a document, instantiating the generated item in the application comprises loading the document in the application when the at least one container engine event comprises a START event or an UPDATE event. In some other examples, where the type of the generated item is a document, instantiating the generated item in the application comprises reloading the document in the application when the at least one container engine event comprises a RESTART event.

In some examples, at least some of the following are implemented in a multi-threaded manner, including monitoring for at least one container engine event associated with the application, detecting the at least one container engine event, generating the item based on the detection of the at least one container engine event, or instantiating the item in the application based on a type of the generated item.

In a CaaS environment, containers may be complete applications, each packaged with application code, libraries, dependencies, and system tools to run on a variety of platforms and infrastructure. Because containers generally have low usage of system resources and are platform independent, they have become the de facto compute units of modern cloud-native applications.

Although one may manually deploy containers across platforms, deploying a vast number of containers across a variety of platforms can be challenging without automated methods for load-balancing, resource allocation, and security enforcement. Container orchestration automates the scheduling, deployment, networking, scaling, health monitoring, and management of containers. A platform that uses container orchestration to manage containers is referred to as a container orchestration engine, a container engine, a container orchestration platform, a container orchestration environment, or a container orchestration tool in the industry and throughout this disclosure. When scheduling the deployment of containers to a host, a container orchestration engine chooses the best host to deploy based on the available computing resources of the host and the requirements of containers.

After containers are deployed by the container orchestration engine, the container orchestration engine also manages the lifecycle of the container and the containerized applications running within the container. The management of containers includes managing the scalability, load balancing, and resource allocation among containers. The management may also include ensuring the availability and performance of containers by relocating the containers to other hosts in the event of host outage or resource shortage.

One method of container orchestration is based on a swarm. A swarm is a collection of physical or virtual machines that have been configured to join together in a cluster. Nodes are physical or virtual machines that have joined the cluster. A typical swarm has at least one manager node and many worker nodes.

A manager node is used to dispatch tasks to worker nodes in the swarm. The manager node also performs the orchestration and cluster management functions to maintain the state of the swarm. Worker nodes receive tasks from manager nodes and execute required actions for the swarm, such as starting or stopping a container.

A container lifecycle includes an initial state, a Created state, a Running state, a Stopped state, a Paused state, and a Deleted state. A container engine may generate one or more container engine events when changing from one state to another. Some events may be generated while the container remains in one state. For example, when a container changes its state from Created state to Running state, a START event may be generated by the container. When a container changes its state from Stopped state to Running state, a RESTART event may be generated by the container engine. When a container is being updated, an UPDATE event may be generated by the container engine.

Besides the START, RESTART, and UPDATE events, a container engine may generate other container engine events. For example, a PAUSE event may be generated when a container changes its state from Running state to Paused state; a STOP event may be generated when the container state is changed from Running state to Stopped state; a DELETE event may be generated when the container state is changed from Stopped state to Deleted state.

FIG. 1 illustrates an example system diagram for a dynamic script generation and execution system. System 100 comprises user 110 and container engine 150. Container engine 150 comprises worker node 120, which comprises contractor service 130 and container 140. Container 140 comprises application 141 running in the container. Contractor service 130 and container 140 are part of worker node 120 in container engine 150. Container engine 150 may have other worker nodes and/or manager nodes (not shown in the figure). In some examples, container engine 150 is a swarm. User 110 is a user of the CaaS platform. Worker node 120 receives commands from a manager node (not shown in the figure) to execute required actions. The commands may include, but are not limited to, a request from user 110, a "create" command, a "start" command, a "stop" command, a "restart" command, a "pause" command, an "unpause" command, and a "delete" command. Upon receiving these commands from the manager node, worker node 120 may change the state of containers from one state to the next according to the lifecycle of a container.

Container 140 is created by worker node 120 in response to a "create" command from a manager node in the swarm. Worker node 120 may have other containers created and running (not shown in the figure). Once container 140 is created, it is changed by worker node 120 to different container states in the container lifecycle based on new commands received from the manager node. As described above, a container may operate in a Created state, a Running state, a Stopped state, a Paused state, or a Deleted state.

Application 141 is created and running in container 140. Application 141 may be a logging application, a monitoring application, or other applications running in a container. Container 140 may have more than one application (not shown in the figure) created and running in the container. Item 142 can be either a script, which may be executed in application 141, or a document, which may be a configuration file of application 141 waiting to be loaded or reloaded by the application. The request to generate item 142 in application 141 may be made by user 110 via a manager node, which then passes the request as a command to worker node 120. The request may also be made by user 110 to worker node 120 directly. Either way, the request to generate item 142 is received by contractor service 130, as indicated by the dashed arrow from user 110 to contractor service 130 in FIG. 1.

Contractor service 130 is a service running in worker node 120. It is a global service that runs on worker nodes of container engine 150. Based on the request, contractor service 130 monitors container engine events generated by or associated with all the containers in worker node 120. When certain container engine events are generated by the container engine 150, the events will be detected by contractor service 130. In some examples, not all the detected events are acted upon by system 100. Contractor service 130 may only detect and act upon certain container engine events specified by user 110. For example, contractor service 130 may act upon START, RESTART and UPDATE events, but not upon PAUSE or DELETE events. When a user specified event is detected, contractor service 130 generates item 142, which can be either a script or document. Depending on the type of item 142 generated, contractor service 130 instantiates item 142 in application 141.

If the type of the generated item 142 is a script, contractor service 130 instantiates item 142 in application 141 by executing the script in the application. As described above, a START event of container 140 may be detected when container 140 is changing its state from the Created state to the Running state. If application 141 is a monitoring application which captures runtime performance data of container 140, when the START event is detected, a script in application 141 needs to be executed to start the service. When a RESTART event of container 140 is detected, meaning that container 140 is changing its state from the Stopped state to the Running state, the script is executed to restart the service. In some examples, after the script is executed, the script may be deleted by contractor service 130.

While executing the script, contractor service 130 may execute one or more shell commands. Contractor service 130 may retrieve environmental information from the cloud environment. Contractor service 130 may retrieve environmental information of container 140 and/or other containers running in worker node 120. Contractor service 130 may also retrieve environmental information of other work nodes in the cluster or in the CaaS platform. Environmental information retrieved by contractor service 130 may include various environmental variables of containers and of the container orchestration environment. Environmental information may also include other parameters of the containers and of the container orchestration environment.

In some examples, a script may be customized with information from the container engine event. A script may comprise a script template, which may be supplied to application 141 on startup. A script may also comprise at least one parameter of the container engine event. To execute the script, the script template may be combined with the parameters of the container engine event and executed by contractor service 130.

If the type of the generated item 142 is a document, contractor service 130 may instantiate item 142 in application 141 in slightly different ways, depending on the container engine events detected. For example, if application 141 is a logging application, the document may be a configuration file of the logging application which contains paths of output log files. The configuration file may be combined with new event information, such as new environmental information of the container and the container orchestration environment, and then loaded or reloaded in the application, depending on the detected event. For example, if a START event is detected by contractor service 130, contractor service 130 will instantiate the generated item 142 by loading the document (e.g., the configuration file) in the logging application 141. Contractor service 130 will do the same if an UPDATE event is detected. If a RESTART event is detected by contractor service 130, contractor service 130 will instantiate the generated item 142 by reloading the document in application 141. This is because the configuration file has already been loaded by contractor service 130 during a START event which happened earlier.

In a CaaS platform environment, hundreds of containers may be created in less than a second. As a result, a large number of container engine events may be generated at any given moment. It is critical for system 100 to capture each and every user specified event and do not miss out on any single event. Therefore, system 100 may be implemented in a multi-threaded manner. For example, a multi-threaded language such as Golang may be used to implement the system.

FIG. 2 illustrates a flow diagram of a dynamic script generation and execution method in accordance with an example. Method 200 may be performed by a worker node in a container engine.

At step 210, a contractor service, which is a global service running in the worker node, receives a request to generate an item in an application running in a container of a cloud environment. The request to generate an item may be made by a platform user via a manager node, which then passes the request as a command to the worker node. The request may also be made by the platform user to the worker node directly. The item to be generated can be either a script or a document in an application. The container is created by the worker node in response to a "create" command from a manager node in the container engine. There is at least one application running in the container.

At step 220, the contractor service, based on the request in step 210, monitors the container for at least one container engine event associated with the application. Container engine events include container events, which are generated by a container engine when the container changes from one state to another. Some container engine events may be generated while the container remains in one state. Container events may include a START event, a RESTART event, and an UPDATE event, etc. Container engine events also include other events generated by the container engine, such as network events, plugin events, node events, and image events, etc.

At step 230, the contractor service detects at least one container engine event. When certain container engine events are generated by the container engine, the events will be detected by the contractor service. In some examples, not all the detected events are acted upon by the contractor service. The contractor service may only detect and act upon certain container engine events specified by the CaaS platform user. For example, the contractor service may act upon START, RESTART, and UPDATE events, but not upon PAUSE or DELETE events.

At step 240, the contractor service generates the item based on the detection of at least one container engine event, such as, a START event, a RESTART event, or an UPDATE event, etc. At step 250, the generated item is instantiated in the application in accordance with the type of the generated item. When the type of the generated item is a script, the contractor service instantiates the item by executing the script in the application. For example, if the application is a monitoring application which captures runtime performance data of the container, when a START event is detected, the script in the application needs to be executed to start the service. When a RESTART event is detected, the script needs to be executed to restart the service. In some examples, after the script is executed, the script may be deleted by the contractor service.

FIG. 3 illustrates a flow diagram of a dynamic document generation and loading method in accordance with an example. Method 300 may be performed by a worker node in a container engine.

At step 310, a contractor service, receives a request to generate a document in an application running in a container of a cloud environment. The request to generate the document may be made by a platform user via a manager node, or by the platform user to the worker node directly. The container is created by the worker node in response to a "create" command from a manager node in the container engine. There is at least one application running in the container.

At step 320, the contractor service, based on the request in step 310, monitors the container for at least one container engine event associated with the application. Container engine events may be generated by a container engine when the container changes from one state to another, or while the container remains in one state. Container engine events may include a START event, a RESTART event, and an UPDATE event, etc. Container engine events also include other events generated by the container engine, such as network events, plugin events, node events, and image events, etc.

At step 330, the contractor service detects at least one container engine event. When certain container engine events are generated by the container engine, the events will be detected by the contractor service. In some examples, not all the detected events are acted upon by the contractor service. The contractor service may only detect and act upon certain container engine events specified by the CaaS platform user. For example, the contractor service may act upon START, RESTART, and UPDATE events, but not upon PAUSE or DELETE events.

At step 340, the contractor service generates the document based on the detection of at least one container engine event, such as, a START event, a RESTART event, or an UPDATE event, etc. Step 350 is a decision box. The contractor service may instantiate the generated item in slightly different ways depending on the container engine events detected. A logging application is used herein as an example to illustrate the decision process. For a logging application, the document may be a configuration file of the logging application which contains paths of output log files. The configuration file may be combined with new event information, such as new environmental information of the container and the container orchestration environment, and then loaded or reloaded in the application, depending on the detected event.

If it is determined at step 350 that a START or UPDATE event is detected by the contractor service, the method of step 361 will be performed. At step 361, the contractor service will instantiate the generated document in the application, including loading the document (e.g., the configuration file) in the application. If it is determined at step 350 that a RESTART event is detected by the contractor service, the method of step 362 will be performed. At step 362, the contractor service will instantiate the generated document in the application, including reloading the document in the application.

Figure 4:
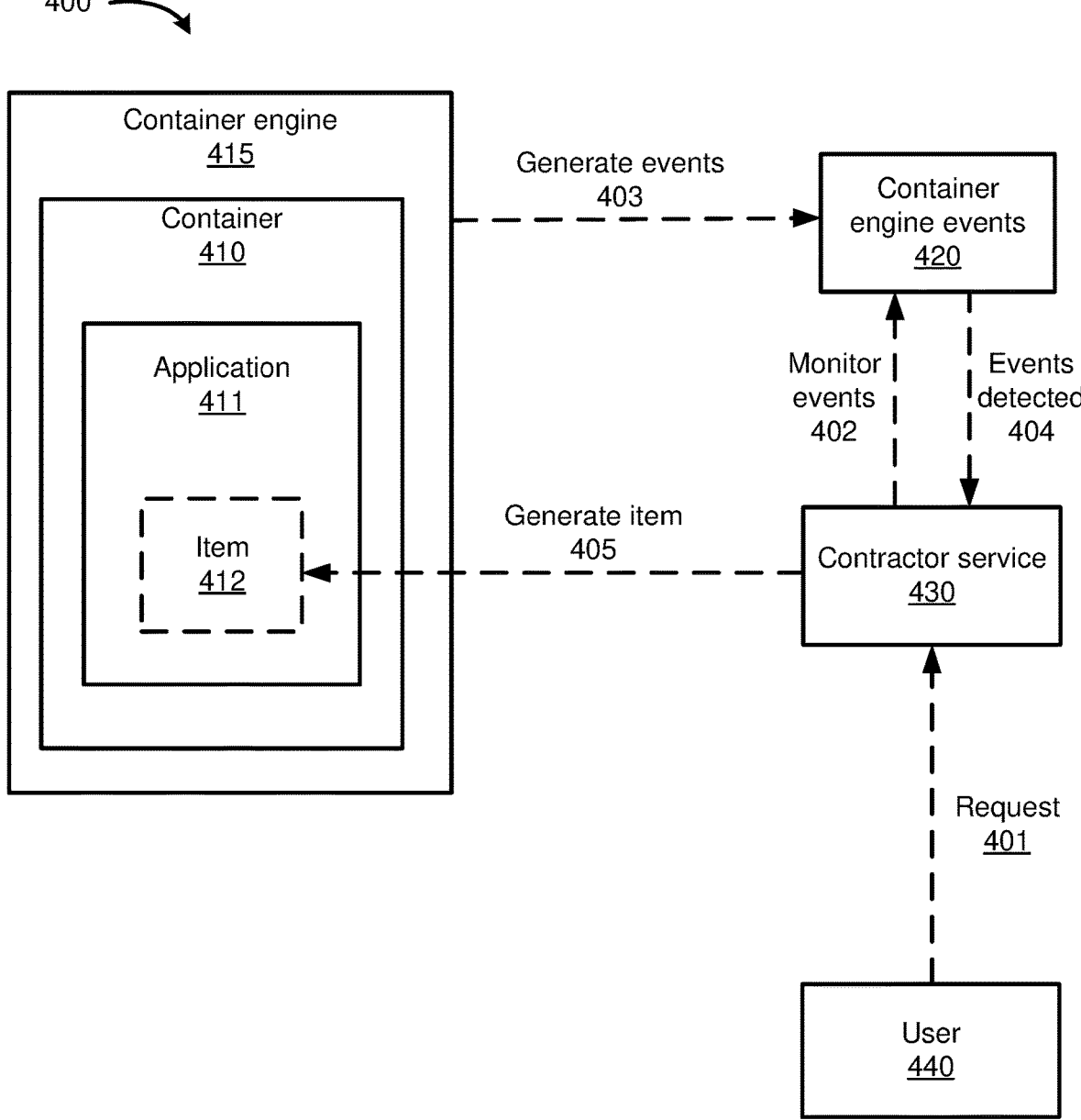
FIG. 4 illustrates a process flow based on an example dynamic script generation and execution system.

FIG. 4 illustrates a process flow based on an example dynamic script generation and execution system. Process flow 400 comprises container 410, container engine 415, container engine events 420, contractor service 430, and user 440. Container 410 and contractor service 430 are part of a worker node (not shown in the figure) of container engine 415. Contractor service 430 may be a global service running in the worker node. User 440 is a user of the CaaS platform.

Container 410 is a container created by the worker node in response to a "create" command from a manager node in the container engine (not shown in the figure). After container 410 is created, container 410 may be changed by the worker node to different container states in the container lifecycle based on new commands received from the manager node. Container 410 may operate in a Created state, a Running state, a Stopped state, a Paused state, or a Deleted state. Container 410 may have one or more applications created and running in the container. Application 411 is created and running in container 410. In some examples, container 410 may have more than one application created and running (not shown in the figure).

At process 401, contractor service 430 receives a request from user 440 to generate item 412 in an application running in container 410. The request to generate item 412 may be made by user 440 via a manager node, which then passes the request as a command to the worker node. The request may also be made by user 440 to the worker node directly. Item 412 to be generated can be either a script or a document in an application.

At process 402, contractor service 430 monitors one or more container engine events 420 generated by container engine 415 and associated with container 410. At process 403, one or more container engine events 420 may be generated by container engine 415 when container 410 changes from one state to another. For example, when container 410 changes its state from the Created state to the Running state, a container engine event "START" may be generated by the container engine 415; or when container 410 changes its state from the Stopped state to the Running state, a RESTART event may be generated by container engine 415. Sometimes, a container engine event may be generated when container 410 remains in one state. For example, when container 410 is being updated, an UPDATE event may be generated by container engine 415.

At process 404, after one or more container engine events are generated by container engine 415, container engine event 420 will be detected by contractor service 430. In some examples, not all the detected events are acted upon in process 404. Contractor service 430 may only detect and act upon certain container engine events specified by user 110. For example, contractor service 430 may act upon START, RESTART, and UPDATE events, but not upon PAUSE or DELETE events.

At process 405, when a user specified container engine event 420 is detected, contractor service 430 generates item 412 in application 411 based on the detection of the container engine event. After item 412 is generated, it is instantiated in application 411 in accordance with the type of item 412. If the type of item 412 is a script, contractor service 430 instantiates item 412 by executing the script in application 411. If the type of item 412 is a document, the contractor service instantiates the item in slightly different ways, depending on the container engine event 420 detected in process 404. For example, if container engine event 420 is a START or UPDATE event, contractor service 430 will instantiate item 412 by loading the document in application 411. If container engine event 420 is a RESTART event, contractor service 430 will instantiate item 412 by reloading the document in application 411.

FIG. 5 illustrates a computer-readable medium in accordance with an example. In various examples, the instructions for performing the various methods herein are stored on a non-transitory computer-readable medium, e.g., computer readable medium (CRM) 501. FIG. 5 is shown from the perspective of instructions performed at a worker node for dynamic script generation and execution in a CaaS platform. For example, CRM 501 may include one or more instructions 510 for receiving, by a contractor service, a request to generate an item in an application running in a container of a cloud environment. The contractor service is a global service running in the worker node. The request to generate an item may be made by a platform user via a manager node, which then passes the request as a command to the worker node. The request may also be made by the platform user to the worker node directly. The item to be generated can be either a script or a document in an application.

Instruction 520 comprises one or more instructions for monitoring, by the contractor service, the container for at least one container engine event associated with the application based on the request. Container engine events may be generated by a container when the container changes from one state to another, or while the container remains in one state.

CRM 501 may also include one or more instructions 530 for detecting, by the contractor service, at least one container engine event. In some examples, only user specified container engine events are detected. Instruction 540 comprises one or more instructions for generating, by the contractor service, the item based on the detection of the at least one container engine event. Instruction 560 comprises one or more instructions for instantiating the generated item in the application in accordance with a type of the generated item.

Figure 6:
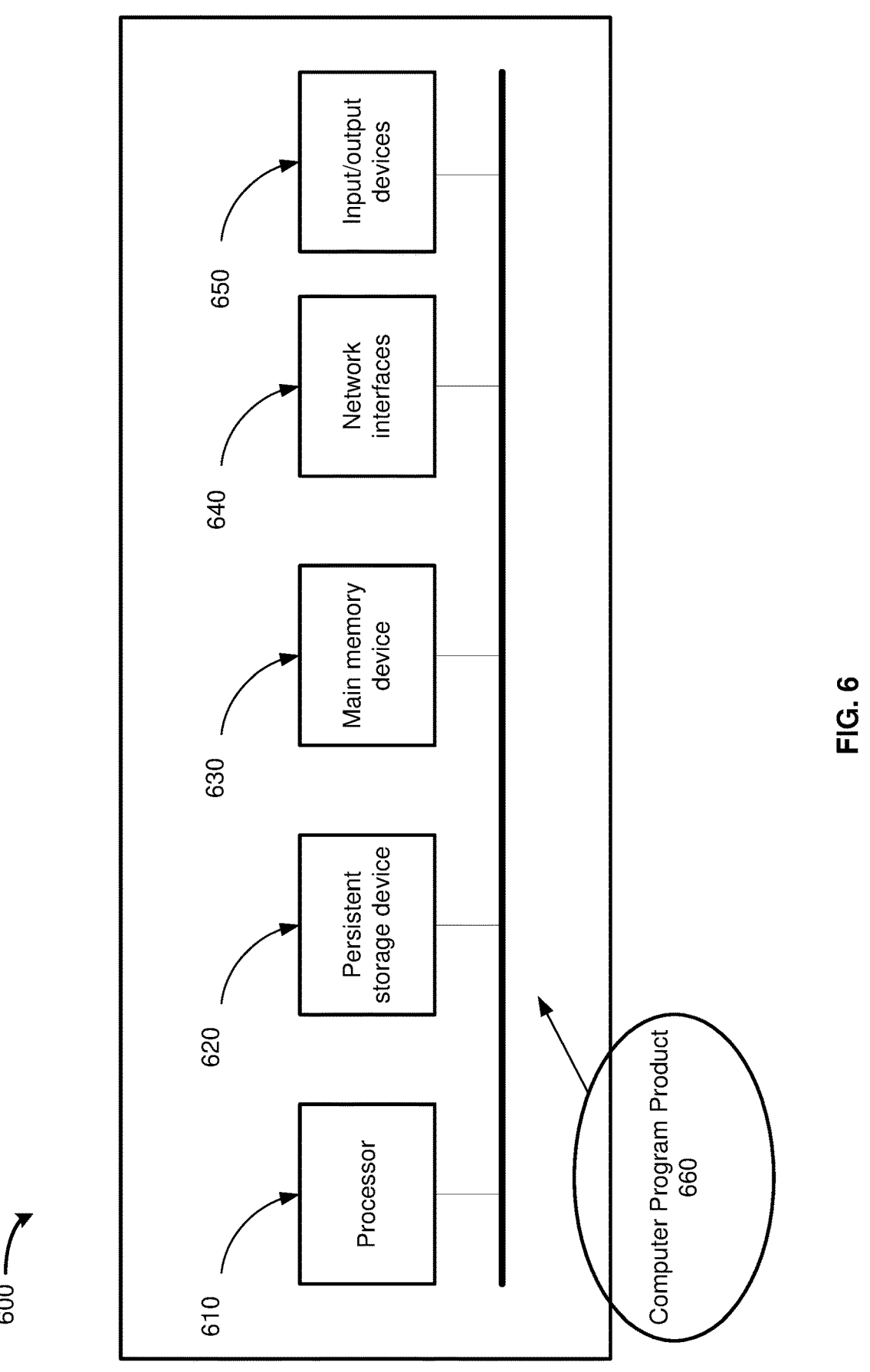
FIG. 6 illustrates a block diagram of a distributed computer system that can be used for implementing one or more aspects of the various examples.

FIG. 6 illustrates a block diagram of a distributed computer system that can be used for implementing one or more aspects of the various examples. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, worker node 120 may comprise one or more components of apparatus 600. Thus, the various method steps of FIGS. 2 and 3 herein can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIGS. 2 and 3 herein. Accordingly, by executing the computer program instructions, processor 610 executes an algorithm defined by the method steps herein. Additionally, or alternatively, instructions for implementing the method steps of FIGS. 2 and 3 herein in accordance with disclosed examples may reside in computer program product 660. When processor 610 is executing the instructions of computer program product 660, the instructions, or a portion thereof, are typically loaded into main memory device 630 from which the instructions are readily accessed by processor 610.

Apparatus 600 also includes one or more network interfaces 640 for communicating with other nodes in a CaaS platform via a network. Apparatus 600 may also include one or more input/output devices 650 that enable user interaction with apparatus 600 (e.g., a display, a keyboard, a mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 650 may include peripherals. For example, input/output devices 650 may include a display device such as a cathode ray tube (CRT), plasma or liquid crystal display (LCD) monitor for displaying information (e.g., a list of currently connected nodes in a CaaS platform) to a user, a keyboard, and a pointing device such as a mouse or a trackball by which the user can provide input to apparatus 600.

Any or all of the systems and apparatuses discussed herein, including worker node 120, may be performed by, and/or incorporated in, an apparatus such as apparatus 600.

One skilled in the art will recognize that an implementation of an actual computer or computer system may have other structures and may contain other components as well (e.g., batteries, fans, motherboards, power supplies, etc.), and that FIG. 6 is a high-level representation of some of the components of such a computer for illustrative purposes.

The various examples are described herein with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described above, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the above discussion, numerous references have been made regarding servers, services, interfaces, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A computer system comprising:
a processor;
at least one memory having computer-readable instructions stored thereon which, when executed by the processor coupled to the at least one memory, cause the processor to:
    receive a user command specifying at least one container event to be monitored and an action to be performed on an application running in a container of a cloud environment;
    based on the user command, monitor the container for the at least one container engine event associated with the application;
    in response to detecting the at least one container engine event indicating a state change associated with the container, perform the action by generating a script corresponding to the at least one container engine event and loading a configuration file in the application when the at least one container engine event comprises a START event or an UPDATE event; and
    execute the generated script in the application.

2. The computer system of claim 1, wherein the process is further to delete the script after executing the script in the application.

3. The computer system of claim 1, wherein executing the script in the application further comprises at least one of:
    executing at least one shell command;
    retrieving environmental information from the cloud environment; or
    retrieving environmental information from another container of the cloud environment.

4. The computer system of claim 1, wherein the script comprises a template corresponding to the type of the generated item and at least one parameter of the at least one container engine event.

5. The computer system of claim 1, wherein performing the action further comprises reloading the configuration file in the application when the at least one container engine event comprises a RESTART event.

6. The computer system of claim 1, wherein the at least one processor is further caused to execute, in a multi-threaded manner, at least some of monitoring for at least one container engine event associated with the application, detecting the at least one container engine event, generating the script based on the detection of the at least one container engine event, or executing the script in the application.

7. A computerized method comprising:
  receiving a user command specifying at least one container event to be monitored and an action to be performed on an application running in a container of a cloud environment;
  based on the user command, monitoring the container for the at least one container engine event associated with the application;
  in response to detecting the at least one container engine event indicating a state change associated with the container, performing the action by generating a script corresponding to the at least one container engine event and loading a configuration file in the application when the at least one container engine event comprises a START event or an UPDATE event; and
  executing the generated script in the application.

8. The method of claim 7, wherein the method further comprises deleting the script after execution in the application.

9. The method of claim 7, wherein executing the script in the application further comprises at least one of:
  executing at least one shell command;
  retrieving environmental information from the cloud environment; or
  retrieving environmental information from another container of the cloud environment.

10. The method of claim 7, wherein the script comprises a template corresponding to the type of the generated item and at least one parameter of the at least one container engine event.

11. The method of claim 7, wherein performing the action further comprises reloading the configuration file in the application when the at least one container engine event comprises a RESTART event.

12. The method of claim 7, wherein at least some of monitoring the plurality of events, determining that the task should be performed, generating the item, or executing the script in the application are performed in a multi-threaded manner.

13. A computer readable medium having computer-readable instructions stored thereon, which, when executed by at least one processor, cause the at least one processor to perform one or more steps comprising:
  receiving a user command specifying at least one container event to be monitored and an action to be performed on an application running in a container of a cloud environment;
  based on the user command, monitoring the container for the at least one container engine event associated with the application;
  in response to detecting the at least one container engine event indicating a status change associated with the container, performing the action by generating a script corresponding to the at least one container engine event and loading a configuration file in the application when the at least one container engine event comprises a START event or an UPDATE event; and
  executing the generated script in the application.

14. The computer readable medium of claim 13, wherein the one or more steps further comprise deleting the script after execution in the application.

15. The computer readable medium of claim 13, wherein executing the script in the application further comprises at least one of:
  executing at least one shell command;
  retrieving environmental information from the cloud environment; or
  retrieving environmental information from another container of the cloud environment.

16. The computer readable medium of claim 13, wherein the script comprises a template corresponding to the type of the generated item and at least one parameter of the at least one container engine event.

17. The computer readable medium of claim 13, wherein performing the action further comprise reloading the configuration file in the application when the at least one container engine event comprises a RESTART event.

18. The computer readable medium of claim 13, wherein the one or more steps are performed by the at least one processor using a multi-threaded program execution technique.

* * * * *